NONDESTRUCTIVE READOUT MEMORY

Filed June 29, 1964

INVENTORS
HEMMIGE V. RANGACHAR
& LUKE DILLON, JR.
BY Carl V. Olson
Attorney

United States Patent Office 3,405,400

Patented Oct. 8, 1968

3,405,400
NONDESTRUCTIVE READOUT MEMORY

Hemmige Venkata Rangachar, Collingswood, and Luke Dillion, Jr., Burlington, N.J., assignors to Radio Corporation of America, a corporation of Delaware
Filed June 29, 1964, Ser. No. 378,510
11 Claims. (Cl. 340—174)

ABSTRACT OF THE DISCLOSURE

A nondestructive readout memory having conductors in grooves at interfaces of three assembled magnetic sheets. The surfaces of a bottom ferrite sheet and a top ferrite sheet at their interfaces with an intermediate "soft" permalloy sheet are provided with grooves. Digit-sense conductors and word conductors are provided in the grooves at one interface. Each word conductor includes straight portions each of which lies closely parallel with a straight portion of one digit-sense conductor. Interrogate conductors are provided in the grooves at the other interface so that each extends in orthogonal relation with the centers of straight parallel portions of digit-sense and word conductors.

This invention relates to magnetic memories, and particularly to arrays of magnetic memory elements linked by sets of conductors so that desired ones of the memory elements may be selectively accessed for the storage and nondestructive readout of binary information.

It is a general object of the present invention to provide an improved magnetic memory array which conveniently may be constructed, by automated techniques, with very small physical dimensions providing high speed operation in the storage and nondestructive retrieval of information.

In accordance with an example of the invention, an array of magnetic elements is constructed including bottom, intermediate and top sheets of magnetic material assembled in sandwich fashion. The surfaces of the top and bottom sheets at their interfaces with the intermediate sheet are provided with grooves. First and second sets of conductors are provided in the grooves at one interface, each conductor of the second set extending generally in a direction orthogonal with conductors of said first set. Each conductor of the second set includes straight portions each of which lies closely parallel with a straight portion of one conductor of said first set. A third set of conductors is provided in the grooves at the other interface so that each extends in orthogonal relation with the centers of straight parallel portions of conductors of the first and second sets.

Figure 1:
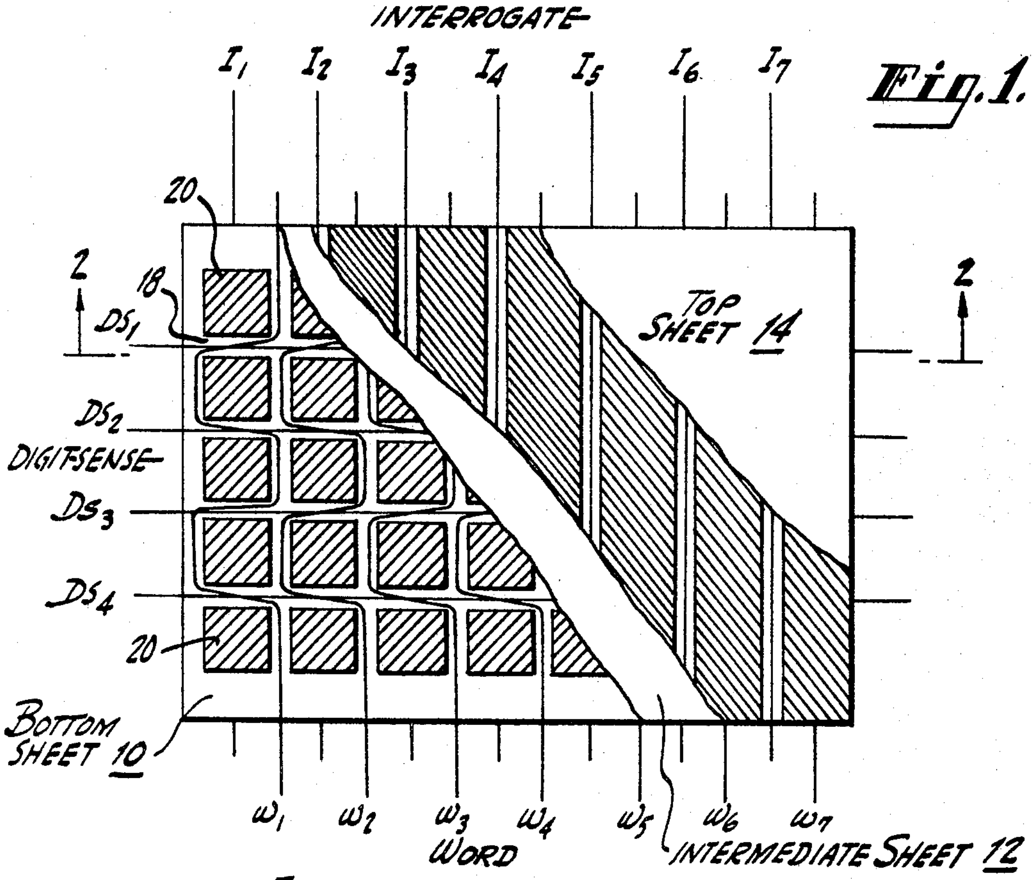
FIG. 1 is a plan view of a nondestructive readout memory array constructed according to the teachings of the invention, parts of the array being cut away to reveal interior construction details.
Figure 2:
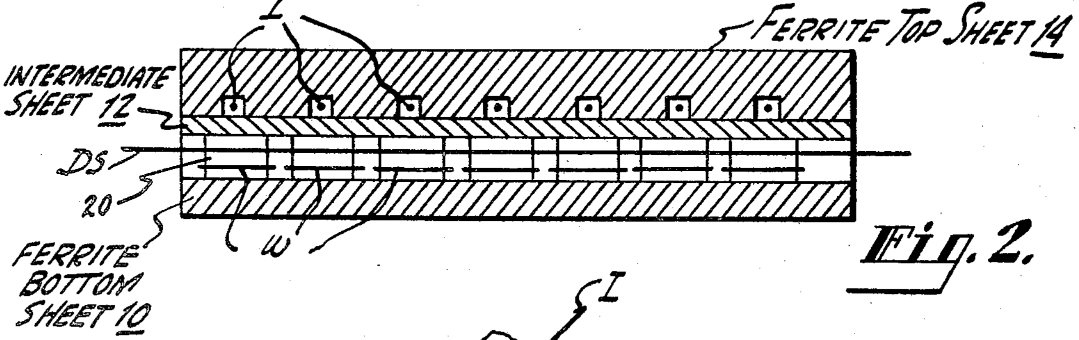
FIG. 2 is a sectional view taken on the line 2—2 of FIG. 1.

The memory array shown in FIGS. 1 and 2 includes a bottom magnetic sheet 10, an intermediate magnetic sheet 12 and a top magnetic sheet 14 assembled together in sandwich fashion and maintained in close physical contact by clamping or encapuslating means (not shown). The magnetic sheets 10 and 14 are preferably made of a "hard" magnetic material, such as sintered ferrite, having a square hysteresis loop characteristic, having a coercive force $H_c$ of about 1.5 or 2.0 oersteds and having surfaces ground and polished to a sufficient smoothness so that substantially no air gaps exist at the interfaces with the intermediate sheet 12. The intermediate sheet 12 is preferably made of a "soft" magnetic material, such as annealed permalloy, having a coercive force $H_c$ of about 0.2 oersted and having a saturation flux about equal to that in the bottom and top sheets 10 and 14. The intermediate sheet 12 is preferably made very thin, and may have a thickness in the order of 0.00025 inch.

The surface of the bottom sheet 10 at its interface with the intermediate sheet 12 is provided, before assembly, with a crosshatch pattern of grooves 18. The crosshatch grooves are preferably constructed by means of ganged diamond saws which are used to first cut one set of parallel grooves extending in the $x$ direction, and then are used to cut another set of parallel grooves extending in the $y$ direction. The cutting of the two sets of grooves in orthogonal directions results in crosshatch grooves defining square posts 20 of magnetic material. The tops of the posts 20 in the lower sheet 10, after assembly, are in close physical contact with the facing surface of the intermediate magnetic sheet 12.

Two sets of conductors are inserted in the crosshatch grooves in the bottom sheet 10 before the intermediate magnetic sheet 12 is positioned to bridge the crosshatch grooves. The conductors in the crosshatch grooves include a first set of straight parallel digit-sense conductors $DS_1$ through $DS_4$. The crosshatch grooves also include a second set of word conductors $W_1$ through $W_7$ extending generally in a direction orthogonally related with the digit-sense conductors. The words conductors W are electrically insulated from the digit-sense conductors and preferably are laid down in a squarewave-shaped pattern as shown with straight portions lying closely parallel with straight portions of the digit-sense conductors.

The surface of the top magnetic sheet 14 at its interface with the intermediate magnetic sheet 12 is provided, before assembly, with parallel spaced grooves which are registered in centered orthogonal relation with the straight parallel portions of the digit-sense and word conductors. Straight parallel interrogate conductors $I_1$ through $I_7$ are positioned in respective grooves in the top magnetic sheet 14 prior to assembly of the ferrite sheets in sandwich fashion.

The three sets of conductors are preferably constructed by circuit printing techniques which are capable of realization in smaller dimensions than is practical with manually formed wires. Conductors may be printed in place in the grooves, the two sets of conductors in the crosshatch grooves being provided with an intervening insulating printed layer to provide electrical insulation between the conductors. Alternatively, the digit-sense and word conductors in the crosshatch grooves may be printed on a thin sheet of insulating plastic having square apertures dimensioned to receive the posts 20. The conductors and supporting crosshatch plastic is then fitted into the crosshatch grooves.

Figure 3:
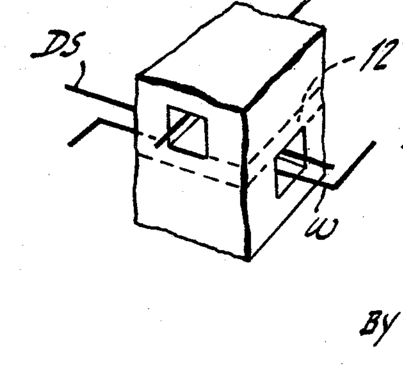
FIG. 3 is a perspective view of a memory element which will be referred to in describing the operation of the memory array of FIGS. 1 and 2.

The described structure including grooved magnetic sheets and conductors provides an array of nondestructive readout memory elements each operationally equivalent to the individual memory element shown in FIG. 3. Each memory element in FIGS. 1 and 2 is constituted by straight parallel portions of a digit-sense conductor DS and a word conductor W, surrounded by magnetic material, the portion of an interrogate winding I extending in orthogonal relation with the straight parallel portions at the centers thereof and the magnetic material surrounding the interrogate conductor. The magnetic material provides closed loop flux paths around the digit-sense conductor DS and the word conductor W which passes in part through a portion (12′ in FIG. 3) of the intermediate magnetic sheet 12. Closed loop flux paths are also provided around the interrogate conductor I including a portion of the intermediate magnetic sheet 12. The closed loop flux paths around the conductors DS and W are orthogonally related in the intermediate sheet 12 with the flux paths therein which surround the interrogate conductor I.

In the operation of the nondestructive readout memory array shown in FIGS. 1 and 2, information is written into the memory elements of one word location by energizing one of the word conductors $W_1$ through $W_7$ simultaneously with the energization of the digit-sense conductors $DS_1$ through $DS_4$ with respective "0"-indicating and "1"-indicating signals. The information stored in a word location is nondestructively read out by applying an interrogate pulse to the respective one of the interrogate conductors $I_1$ through $I_7$. The interrogate pulse causes a temporary rotation of the remanent flux in the respective adjacent portions of the intermediate sheet 12 which results in the inducing of sense signals on the digit-sense conductors $DS_1$ through $DS_4$. The reading out of information is accomplished without destroying the information stored in the memory elements of the word storage locations.

The array of nondestructive readout memory elements provided by the assembly of FIGS. 1 and 2 is superior to an array of individual homogeneous memory elements like the one shown in FIG. 3. The "soft" magnetic material of the intermediate sheet 12 provides a flux interaction region which is superior to the interaction region 12' in the element of FIG. 3, which is necessarily constructed entirely of "hard" magnetic material. The "soft" intermediate sheet provides an effective interaction region for the orthogonally-related flux paths through the "hard" bottom and top sheets. Faster operation, lower drive requirements and larger output sense signals result because the writing of information into the "hard" bottom sheet, and the interrogation of information stored in the "hard" bottom sheet, do not involve the permanent switching of flux in the "soft" interaction region.

The array of nondestructive readout memory elements of FIGS. 1 and 2 is also superior in that it may conveniently be constructed, by economical automated or batch fabrication techniques, to provide physically very small memory elements which can be operated at relatively high speeds.

What is claimed is:

1. The combination of
bottom, intermediate and top sheets of magnetic material assembled in sandwich fashion, the surfaces of the top and bottom sheets at their interfaces with said intermediate sheet being provided with grooves.
first and second sets of conductors in said grooves at one interface, each conductor of said second set extending generally in a direction orthogonal with conductors of said first set, each conductor of said second set including straight portions each of which lies closely parallel with a straight portion of one conductor of said first set, and
a third set of conductors in the grooves at the other interface each extending in orthogonal relation with the centers of straight parallel portions of conductors of said first and second sets.

2. An array of magnetic elements, comprising
bottom, intermediate and top sheets of magnetic material assembled in sandwich fashion, the facing surfaces of two of said sheets at the two interfaces being provided with grooves,
first and second sets of conductors in said grooves at one interface, each conductor of said second set extending generally in a direction orthogonal with conductors of said set, each conductor of said second set including straight portions each of which lies closely parallel with a straight portion of one conductor of said first set, and
a third set of conductors in the grooves at the other interface each extending in orthogonal relation with the centers of straight parallel portions of conductors of said first and second sets.

3. An array of nondestructive readout magnetic memory elements, comprising
bottom, intermediate and top sheets of magnetic material assembled in sandwich fashion, the surfaces of the top and bottom sheets at their interfaces with said intermediate sheet being provided with grooves,
a first set of digit-sense conductors and a second set of word conductors in said grooves at one interface, said word conductors extending generally in a direction orthogonal with said digit-sense conductors, each word conductor including straight portions each of which lies closely parallel with a straight portion of one digit-sense conductor, and
a third set of interrogate conductors in the grooves at the other interface each extending in orthogonal relation with the centers of straight parallel portions of said digit-sense and word conductors.

4. An array of nondestructive readout magnetic elements, comprising
bottom, intermediate and top sheets of magnetic material assembled in sandwich fashion, the top surface of the bottom sheet and the bottom surface of the top sheet at their interfaces with said intermediate sheet being provided with grooves,
a first set of digit-sense conductors and a second set of word conductors in said grooves at one interface, said word conductors extending generally in a direction orthogonal with said digit-sense conductors, each word conductor including straight portions each of which lies closely parallel with a straight portion of one digit-sense conductor, and
a third set of interrogate conductors in the grooves at the other interface each extending in orthogonal relation with the centers of straight parallel portions of word and digit-sense conductors.

5. An array of magnetic elements, comprising
bottom, intermediate and top sheets of magnetic material assembled in sandwich fashion, the surface of one of said sheets at the interface between said bottom and intermediate sheets being provided with crosshatch grooves, the surface of one of said sheets at the interface between said intermediate and top sheets being provided with straight parallel grooves,
a first set of straight parallel conductors in said crosshatch grooves,
a second set of squarewave-shaped conductors in said crosshatch grooves each extending generally in a direction orthogonal with conductors of said first set, and having straight portions lying closely parallel with portions of conductors of said first set, and
a third set of straight parallel conductors in said straight parallel grooves each extending in orthogonal relation with the centers of straight parallel portions of conductors of said first and second sets.

6. An array of magnetic elements, comprising
bottom, intermediate and top sheets of magnetic material assembled in sandwich fashion, the surface of one of said bottom sheet at the interface with said intermediate sheets being provided with crosshatch grooves, the surface of one of said top sheet at the interface with said intermediate sheet being provided with straight parallel grooves,
a first set of straight parallel conductors in said crosshatch grooves,
a second set of squarewave-shaped conductors in said crosshatch grooves each extending generally in a direction orthogonal with conductors of said first set, and having straight portions lying closely parallel with portions of conductors of said first set, and
a third set of straight parallel conductors in said straight parallel grooves each extending in orthogonal relation with the centers of straight parallel portions of conductors of said first and second sets.

7. An array of nondestructive readout magnetic elements, comprising bottom, intermediate and top sheets of magnetic material assembled in sandwich fashion, the top surface of said bottom sheet being provided with crosshatch grooves, the bottom surface of one of said top sheet being provided with straight parallel grooves.

a first set of straight parallel conductors in said crosshatch grooves, a second set of squarewave-shaped conductors in said crosshatch grooves each extending generally in a direction orthogonal with conductors of said first set, and having straight portions lying closely parallel with portions of conductors of said first set, and a third set of straight parallel conductors in said straight parallel grooves each extending in orthogonal relation with the centers of straight parallel portions of conductors of said first and second sets.

8. An array of nondestructive magnetic readout elements, comprising bottom, intermediate and top sheets of magnetic material assembled in sandwich fashion, the surface of one of said sheets at the interface between said bottom and intermediate sheets being provided with crosshatch grooves, the surface of one of said sheets at the interface between said intermediate and top sheets being provided with straight parallel grooves, a first set of straight parallel digit-sense conductors in said crosshatch grooves, a second set of squarewave-shaped word conductors in said crosshatch grooves each extending generally in a direction orthogonal with said digit-sense conductors, and having straight portions lying closely parallel with portions of said digit-sense conductors, and a third set of straight parallel interrogate conductors in said straight parallel grooves each extending in orthogonal relation with the centers of straight parallel portions of said digit-sense and word conductors.

9. A combination of a magnetically "soft" intermediate sheet assembled in sandwich fashion between magnetically "hard" bottom and top sheets, the surfaces of the top and bottom sheets at their interfaces with said intermediate sheet being provided with grooves, first and second sets of conductors in said grooves at one interface, each conductor of said second set extending generally in a direction orthogonal with conductors of said first set, each conductor of said second set including straight portions each of which lies closely parallel with a straight portion of one conductor of said first set, and a third set of conductors in the grooves at the other interface each extending in orthogonal relation with the centers of straight parallel portions of conductors of said first and second sets.

10. The combination of a magnetically "soft" intermediate sheet assembled in sandwich fashion between magnetically "hard" bottom and top sheets, surfaces of said sheets at interfaces therebetween being provided with grooves, and a plurality of sets of conductors located in said grooves.

11. The combination of a magnetically "soft" intermediate sheet assembled in sandwich fashion between magnetically "hard" bottom and top sheets, first and second sets of conductors at the interface between the bottom and intermediate sheets, each conductor of said second set extending generally in a direction orthogonal with conductors of said first set, each conductor of said second set including straight portions each of which lies closely parallel with a straight portion of one conductor of said first set, and a third set of conductors at the interface between the intermediate and top sheets, each conductor of said third set extending in orthogonal relation with the centers of straight parallel portions of conductors of said first and second sets.

References Cited

UNITED STATES PATENTS 3,235,853 2/1966 Luebbe ............. 340—174

BERNARD KONICK, *Primary Examiner.*

P. SPERBER, *Assistant Examiner.*